(12) United States Patent
Brumley et al.

(10) Patent No.: US 9,985,694 B2
(45) Date of Patent: May 29, 2018

(54) METHODS AND SYSTEMS FOR CONTACTLESS BATTERY DISCHARGING

(71) Applicant: MOTOROLA SOLUTIONS, INC, Schaumburg, IL (US)

(72) Inventors: Edward W. Brumley, Lawreneville, GA (US); Michael D. Geren, Suwanee, GA (US); John E. Herrmann, Suwanee, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 729 days.

(21) Appl. No.: 14/493,582

(22) Filed: Sep. 23, 2014

(65) Prior Publication Data

US 2016/0087685 A1 Mar. 24, 2016

(51) Int. Cl.
*H02J 5/00* (2016.01)
*H02J 7/00* (2006.01)
(Continued)

(52) U.S. Cl.
CPC ............ *H04B 5/0037* (2013.01); *H02J 5/005* (2013.01); *H02J 7/0063* (2013.01); *H02J 7/0075* (2013.01);
(Continued)

(58) Field of Classification Search
None
See application file for complete search history.

(56) References Cited

U.S. PATENT DOCUMENTS 8,698,450 B2  4/2014  Yeh
9,095,729 B2 *  8/2015  John ................... A61N 1/3785
(Continued)

FOREIGN PATENT DOCUMENTS

WO    2014/112019 A1    7/2014

OTHER PUBLICATIONS

International Search Report and Written Opinion for corresponding International Patent Application No. PCT/US2015/048798, dated Nov. 6, 2015.

*Primary Examiner* — Jared Fureman
*Assistant Examiner* — Joel Barnett
(74) *Attorney, Agent, or Firm* — Barbara R. Doutre

(57) ABSTRACT

Disclosed herein are methods and systems for contactless battery discharging. One embodiment takes the form of a contactless power-transfer system that includes a wireless-communication interface, a controller connected to the wireless-communication interface, a magnetic-resonance circuit, a power-conditioning circuit connected to the magnetic-resonance circuit, and a load element connected to the power-conditioning circuit. The controller is configured to determine that a smart-battery system is in a discharge-needed state and responsively transmit, via the wireless-communication interface, a battery-discharge command instructing the smart-battery system to generate an oscillating magnetic field. The magnetic-resonance circuit is configured to couple with the generated oscillating magnetic field and responsively output a corresponding power signal. The power-conditioning circuit is configured to receive the power signal from the magnetic-resonance circuit, rectify the received power signal, and output the rectified power signal. The load element is configured to receive the rectified power signal from the power-conditioning circuit.

10 Claims, 8 Drawing Sheets

(51) Int. Cl.
*H04B 5/00* (2006.01)
*H02J 7/02* (2016.01)

(52) U.S. Cl.
CPC ....... *H02J 7/025* (2013.01); *H02J 2007/0067* (2013.01); *H02J 2007/0098* (2013.01)

(56) References Cited

U.S. PATENT DOCUMENTS

| | | | |
|---|---|---|---|
| 2004/0145350 A1* | 7/2004 | Ogonowsky | H02J 7/0075 320/137 |
| 2010/0259109 A1 | 10/2010 | Sato | |
| 2011/0241618 A1 | 10/2011 | Karalis et al. | |
| 2012/0001589 A1 | 1/2012 | Yeh | |
| 2012/0001593 A1* | 1/2012 | Di Guardo | H02J 7/025 320/108 |
| 2012/0013295 A1 | 1/2012 | Yeh | |
| 2014/0015328 A1 | 1/2014 | Beaver et al. | |
| 2014/0049422 A1 | 2/2014 | Von Novak | |
| 2014/0152248 A1 | 6/2014 | Yeh | |
| 2014/0152249 A1 | 6/2014 | Yeh | |

* cited by examiner

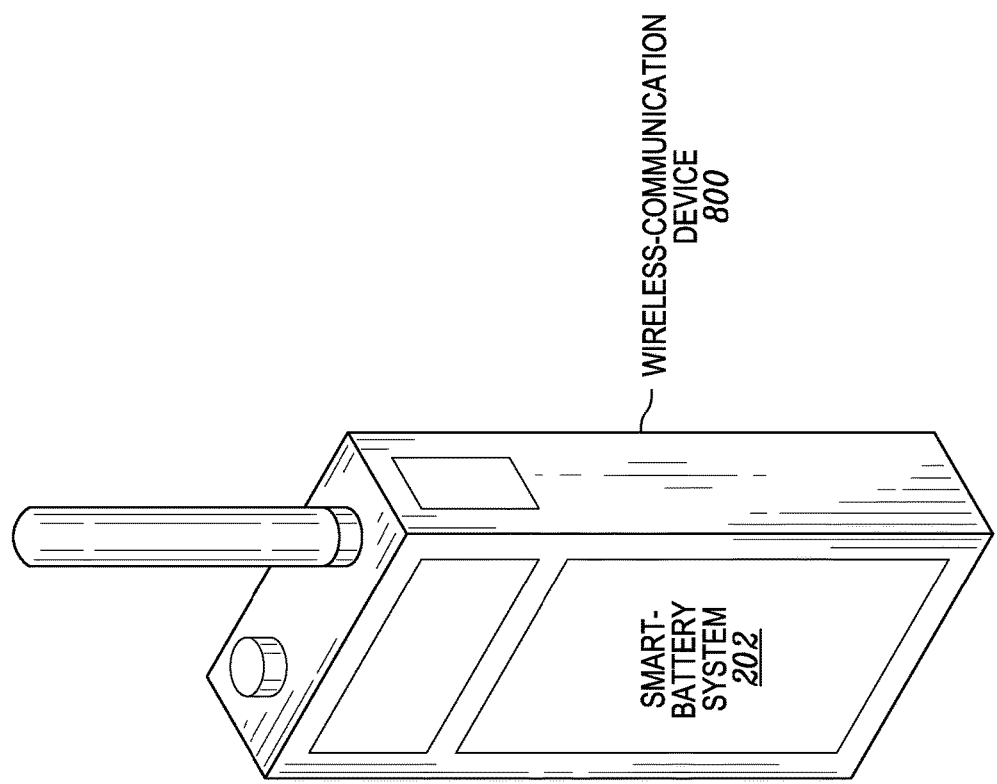

METHODS AND SYSTEMS FOR CONTACTLESS BATTERY DISCHARGING

BACKGROUND OF THE INVENTION

Mobility is important. Wireless-communication infrastructures have enabled the dawn of all sorts of devices that no longer require hardwired connections when sending and receiving data. Such devices, and many others, require electronic power to function; in many cases, this power comes from a rechargeable battery. Recently, wireless charging has emerged as an option for powering and recharging various devices. With wireless charging, the devices are less reliant on wired connections and the presence of traditional outlets. One method for wireless power transmission includes generating an oscillating magnetic field by using an AC signal to drive a solenoid or source coil. In such a system, a power transmitter is plugged into a wall outlet and a mobile device wirelessly receives power from it. The mobile device uses the changing magnetic flux to generate a current in a coil of its own.

In a way, the rechargeable battery limits the mobility of these devices because it must be plugged in to specialized devices to undergo various forms of battery maintenance (e.g., such as battery recalibration). As a result of the need for periodic maintenance, the mobility of these devices is compromised for extended durations (e.g., when the device is docked in a battery reconditioning system). Battery maintenance is a crucial process that is required for optimizing the lifespan and accuracy of rechargeable batteries. Without regular maintenance, reported battery power levels cannot be relied upon, and maximum charging capacity cannot be attained. Oftentimes, the maintenance process requires algorithmic charging and discharging of the battery. Such a process traditionally requires a hard connection and therefore inhibits the mobile nature of the device within which the battery is embedded. For these reasons and others, there is a need for methods and systems for contactless battery discharge.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 8 depicts the example smart-battery system of FIG. 2, incorporated into an example wireless-communication device, in accordance with an embodiment.

Figure 1:
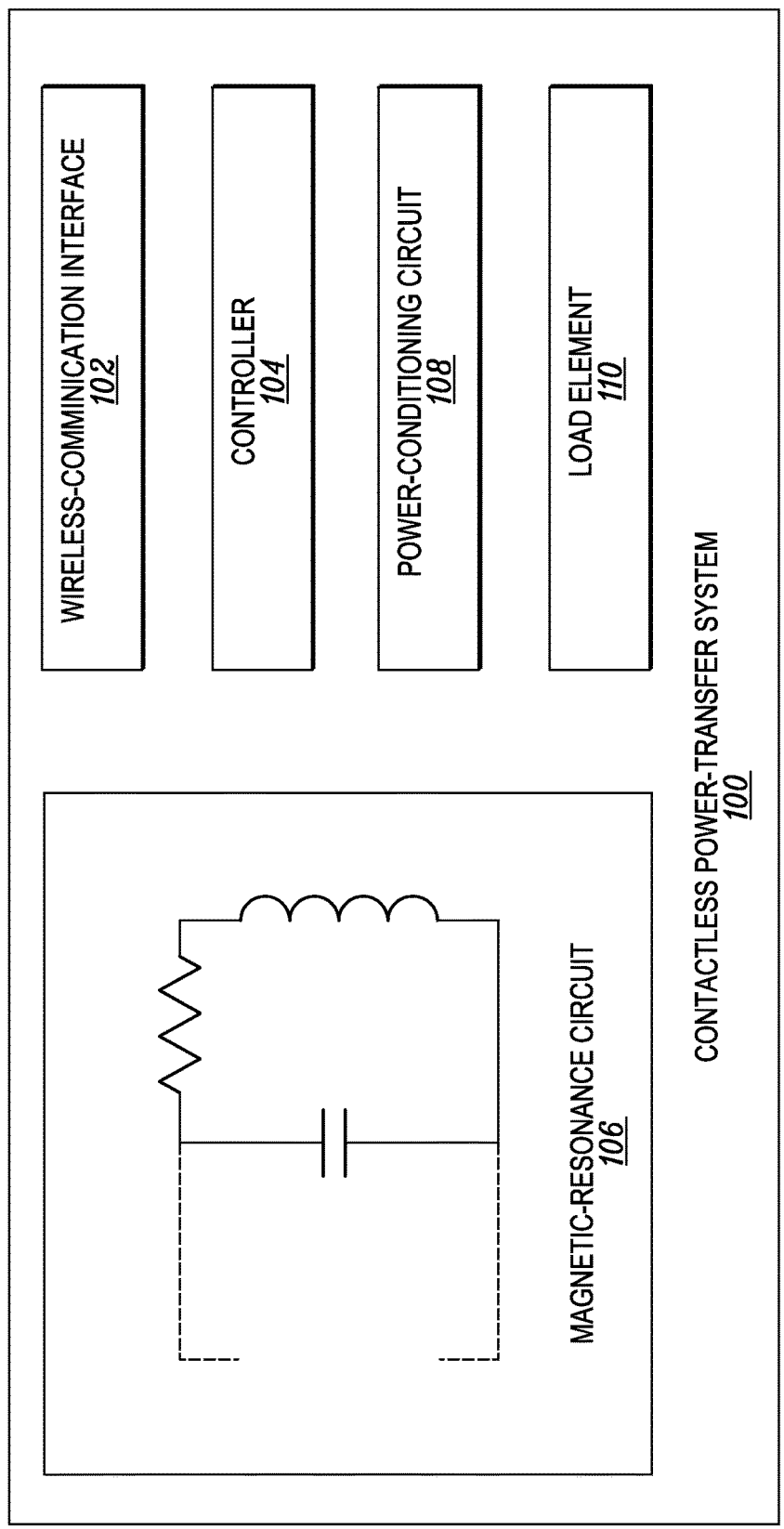
FIG. 1 depicts an example contactless power-transfer system, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for contactless battery discharge. One embodiment takes the form of a contactless power-transfer system that includes a wireless-communication interface, a controller connected to the wireless-communication interface, a magnetic-resonance circuit, a power-conditioning circuit connected to the magnetic-resonance circuit, and a load element connected to the power-conditioning circuit. The controller is configured to determine that a smart-battery system is in a discharge-needed state and responsively transmit, via the wireless-communication interface, a battery-discharge command instructing the smart-battery system to generate an oscillating magnetic field. The magnetic-resonance circuit is configured to couple with the generated oscillating magnetic field and responsively output a corresponding power signal. The power-conditioning circuit is configured to receive the power signal from the magnetic-resonance circuit, rectify the received power signal, and output the rectified power signal. The load element is configured to receive the rectified power signal from the power-conditioning circuit.

Another embodiment takes the form of a process that includes determining that a smart-battery system is in a discharge-needed state. The process also includes transmitting, via a wireless-communication interface, a battery-discharge command instructing the smart-battery system to generate an oscillating magnetic field. The process also includes receiving a power signal into a power-conditioning circuit from a magnetic-resonance circuit that is configured to couple with the generated oscillating magnetic field, the power-conditioning circuit being configured to rectify the power signal and output the rectified power signal to a load element.

Moreover, any of the variations and permutations described in the ensuing paragraphs and anywhere else in this disclosure can be implemented with respect to any embodiments, including with respect to any method embodiments and with respect to any system embodiments.
}

In at least one embodiment, the discharge-needed state comprises a reconditioning-needed state, and the battery-discharge command comprises a reconditioning command.

In at least one embodiment, the discharge-needed state comprises a recalibration-needed state, and the battery-discharge command comprises a recalibration command.

In at least one embodiment, the controller determines that the smart-battery system is in a discharge-needed state based at least in part on detecting the presence of the smart-battery system via the wireless-communication interface.

In at least one embodiment, the contactless power-transfer system further comprises a ping circuit connected to the magnetic-resonance circuit and to the controller. The ping circuit is configured to (i) generate pings and transmit the generated pings via the magnetic-resonance circuit and (ii) receive return pings via the magnetic-resonance circuit and output the received return pings to the controller. In such an embodiment the controller determines that the smart-battery system is in a discharge-needed state based at least in part on detecting the receipt of return pings from the ping circuit.

In at least one embodiment, the controller is further configured to transmit, via the wireless-communication interface, a battery-information request to the smart-battery system and to receive, via the wireless-communication interface, a battery-information response from the smart-battery system. Furthermore, the controller determines that the smart-battery system is in a discharge-needed state based at least in part on the received battery-information response.

In at least one such embodiment, the received battery-information response includes one or more of a battery identifier, a charge level, a voltage level, a maintenance history, a condition status, and a calibration status.

In at least one embodiment, the contactless power-transfer system further comprises a user interface connected to the controller and configured to receive a battery-discharge user instruction and responsively output a battery-discharge directive to the controller. Furthermore, the controller determines that the smart-battery system is in a discharge-needed state based at least in part on receiving the battery-discharge directive.

In at least one embodiment, the generated magnetic field oscillates at a first frequency, and the magnetic-resonance circuit is resonant at a second frequency that is substantially equal to the first frequency.

In at least one embodiment, the controller is further connected to the magnetic-resonance circuit and further configured to tune a resonant frequency of the magnetic-resonance circuit. In at least one such embodiment, the controller is configured to tune the resonant frequency of the magnetic-resonance circuit based at least in part on at least one of a battery-reconditioning protocol and a battery-recalibration protocol. In at least one other such embodiment, the controller is configured to tune the resonant frequency of the magnetic-resonance circuit based at least in part on received feedback data.

In at least one embodiment, the load element dissipates at least some of the received rectified power signal. In at least one such embodiment, the load element is a set of resistors. In at least one such embodiment, a heat sink helps dissipate heat generated by the load element.

In at least one embodiment, the load element stores at least some of the received rectified power signal. In at least one such embodiment, the load element is a rechargeable battery. In at least one other such embodiment, the load element is a set of capacitors.

In at least one embodiment, the load element recycles at least some of the received rectified power signal. In at least one such embodiment, the at least some of the received rectified power signal is used by the contactless power-transfer system. In at least one other such embodiment, the at least some of the received rectified power signal is used by an external device.

In at least one embodiment, the magnetic-resonance circuit is further connected to a power source and is further configured to generate an oscillating magnetic field.

In at least one embodiment, the controller is further connected to the magnetic-resonance circuit and further configured to determine that the smart-battery system is in a chargeable state and responsively instruct the magnetic-resonance circuit to generate an oscillating magnetic field.

Another embodiment takes the form of a smart-battery system that includes a rechargeable battery, a wireless-communication interface, a controller connected to the wireless-communication interface, an oscillatory amplifier circuit connected to the rechargeable battery, and a magnetic-resonance circuit connected to the oscillatory amplifier circuit. The controller is configured to receive, via the wireless-communication interface, a battery-discharge command instructing the rechargeable battery to output a power signal. The oscillatory amplifier circuit is configured to receive the power signal from the rechargeable battery, transform the received power signal into a corresponding oscillatory power signal, and output the oscillatory power signal. The magnetic-resonance circuit is configured to (i) receive the oscillatory power signal from the oscillatory amplifier circuit and (ii) generate an oscillating magnetic field at least in part by driving a coil with the received oscillatory power signal.

In at least one embodiment, the smart-battery system is configured to function as a power source for a wireless-communication device.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts an example contactless power-transfer system, in accordance with an embodiment. The example contactless power-transfer system 100 includes a wireless-communication interface 102, a controller 104, a magnetic-resonance circuit 106, a power-conditioning circuit 108, and a load element 110. In the depiction of the contactless power-transfer system 100, all connections are omitted; this is not to suggest that the various components 102-110 operate in isolation, rather the lack of depicted connections is solely for the sake of visual simplicity. In all depictions of the contactless power-transfer system 100, the various components can indeed communicate with each other as needed, and the communication links may take the form of wired and/or wireless connections.

The wireless-communication interface 102 sets up a communication link for wireless data transfer with a smart-battery system (that is not shown in FIG. 1). The data that is transferred, via the wireless-communication interface 102, between the contactless power-transfer system 100 and the smart-battery system is discussed later, in connection with relevant figures. In at least one embodiment, the wireless-communication interface 102 operates according to one or more of NFC, RFID, radio communication, BLUETOOTH, WIFI, cellular communication, infrared, and ultrasound. Of course many other types of wireless-communication protocols could be used as well, as known by those with skill in the relevant art. The wireless-communication interface 102 is connected to the controller 104.

The controller 104 sends commands to various system components and receives signals and data from the various system components as well. The controller 104 can be implemented as a micro-processing unit (e.g., such as a CPU) and can perform basic computations in order to determine which commands are sent responsive to certain inputs. The controller 104 can be configured to perform a plurality of tasks, some of which are described herein with reference to relevant figures. In at least one embodiment, the controller 104 determines that a smart-battery system is in a discharge-needed state based at least in part on detecting the presence of the smart-battery system via the wireless-communication interface 102. For example, if the wireless-communication interface 102 is implemented as a Bluetooth device, the presence of the smart-battery system can be recognized when the Bluetooth device detects the smart-battery system as a pairing option. In another example, an RFID tag of the smart-battery system alerts the wireless-communication interface 102 (embodied as an RFID sensor) of the smart-battery system's proximity. And certainly numerous other examples could be listed as well.

The magnetic-resonance circuit 106 is configured to couple with an oscillating magnetic field and receive wireless power. The smart-battery system generates an oscillating magnetic field and sends power, via the oscillating magnetic field, to the contactless power-transfer system 100. The oscillating magnetic field is associated with a continuously changing magnetic flux. The changing magnetic flux is converted into a power signal by the magnetic-resonance circuit 106. The power signal is then output to the power-conditioning circuit 108. In at least one embodiment, the magnetic-resonance circuit 106 is a simple RLC circuit. In at least one embodiment, the magnetic-resonance circuit 106 includes a capacitor, a resistor, and a coil all connected in parallel. In at least one embodiment, the magnetic-resonance circuit 106 is a static configuration with a constant resonant frequency. In such an embodiment, the constant resonant frequency is substantially equal to a frequency of the oscillating magnetic field.

The power-conditioning circuit 108 is connected to the magnetic-resonance circuit 106. The power-conditioning circuit 108 rectifies the received power signal, and outputs the rectified power signal. In at least one embodiment, the power-conditioning circuit 108 transforms an AC signal into a DC signal. In at least one embodiment, the power-conditioning circuit 108 includes a full-wave rectifier, a filter, and an over-voltage protection circuit. In at least one embodiment, the power-conditioning circuit 108 is configured so that the signal generated by the magnetic-resonance circuit 106 is adjusted so as to make the modified signal safely usable by other components of the contactless power-transfer system 100.

The load element 110 is configured to receive the rectified power signal from the power-conditioning circuit 108. In at least one embodiment, the load element dissipates at least some of the received rectified power signal. In at least one such embodiment, the load element includes a set of resistors. In at least one other such embodiment, a heat sink helps dissipate heat generated by the load element. In at least one embodiment, the load element stores at least some of the received rectified power signal. In at least one such embodiment, the load element includes a rechargeable battery. In at least one other such embodiment, the load element includes a set of capacitors. In at least one embodiment, the load element recycles at least some of the received rectified power signal. In at least one such embodiment, the at least some of the received rectified power signal is used by the contactless power-transfer system. In at least one other such embodiment, the at least some of the received rectified power signal is used by an external device.

Figure 2:
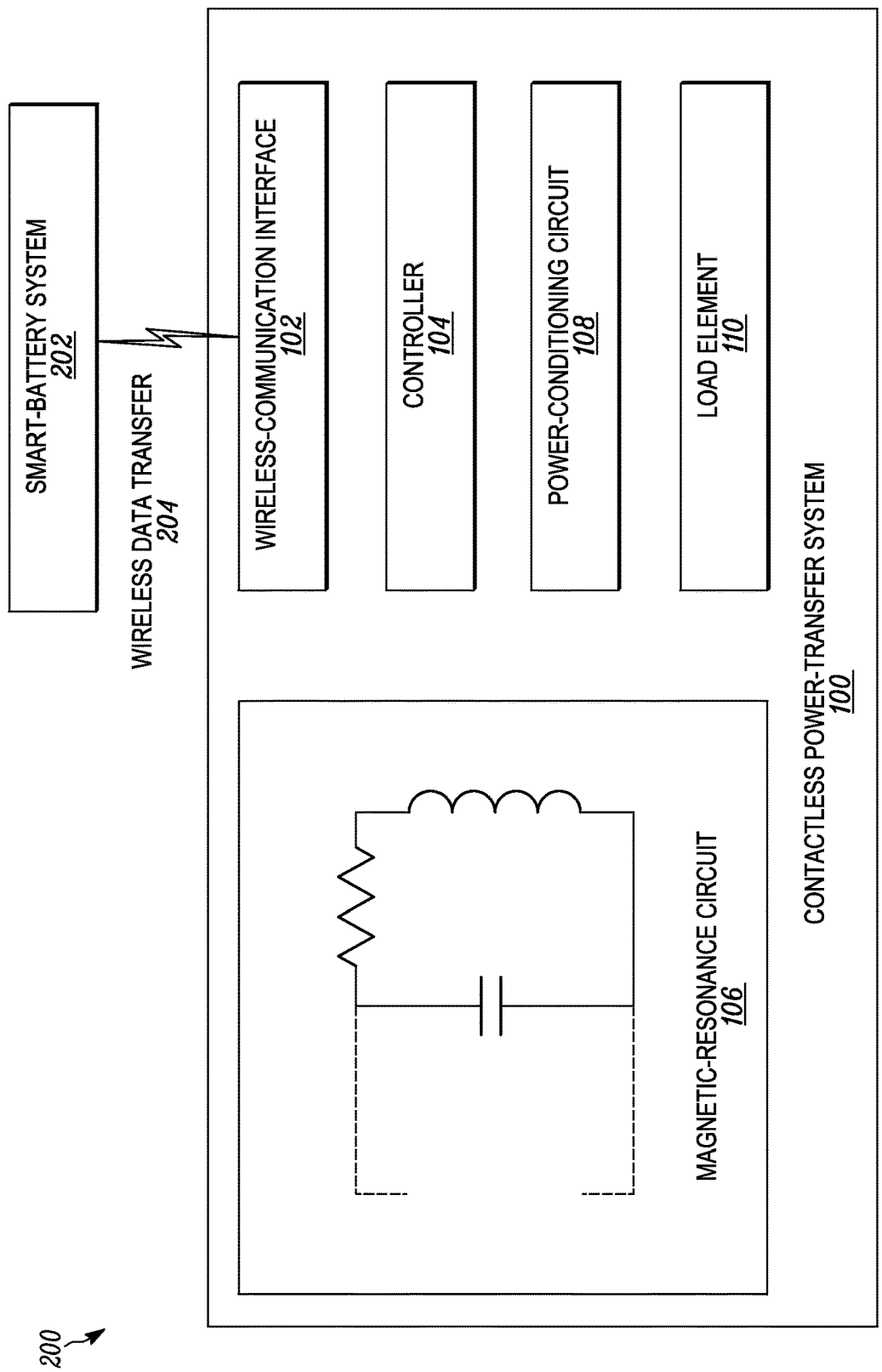
FIG. 2 depicts a first example scenario, in which the example contactless power-transfer system of FIG. 1 is engaged in wireless communication with an example smart-battery system, in accordance with an embodiment.

FIG. 2 depicts a first example scenario, in which the example contactless power-transfer system of FIG. 1 is engaged in wireless communication with an example smart-battery system, in accordance with an embodiment. In particular, FIG. 2 depicts a scenario 200, wherein the contactless power-transfer system 100 of FIG. 1 is shown wirelessly communicating, via a wireless data transfer 204, with a smart-battery system 202. In at least one embodiment, the contactless power-transfer system 100 of FIG. 2 includes the components previously discussed in connection with FIG. 1. The controller 104 is configured to determine that the smart-battery system 202 is in a discharge-needed state and responsively transmit, via the wireless-communication interface 102, a battery-discharge command instructing the smart-battery system 202 to generate an oscillating magnetic field. In one embodiment, the battery-discharge command is sent over the wireless data transfer 204. The magnetic-resonance circuit 106 is configured to couple with the generated oscillating magnetic field and responsively output a corresponding power signal. The power-conditioning circuit 108 is configured to receive the power signal from the magnetic-resonance circuit 106, rectify the received power signal, and output the rectified power signal. The load element 110 is configured to receive the rectified power signal from the power-conditioning circuit 108.

In at least one embodiment, the controller 104 is further configured to transmit, via the wireless-communication interface 102, a battery-information request to the smart-battery system 202 and to receive, via the wireless-communication interface 102, a battery-information response from the smart-battery system 202. In one embodiment, the battery-information request and the battery-information response are sent over the wireless data transfer 204. The controller 104 may determine that the smart-battery system 202 is in a discharge-needed state based at least in part on the received battery-information response. In at least one such embodiment, the received battery-information response includes one or more of a battery identifier, a charge level, a voltage level, a maintenance history, a condition status, and a calibration status.

In at least one embodiment, the contactless power-transfer system 100 of FIG. 2 further comprises a user interface (not shown in FIG. 2) connected to the controller 104 and configured to receive a battery-discharge user instruction and responsively output a battery-discharge directive to the controller 104. Furthermore, the controller 104 determines that the smart-battery system 202 is in a discharge-needed state based at least in part on receiving the battery-discharge directive. In at least one embodiment, the discharge-needed state comprises a reconditioning-needed state, and the battery-discharge command comprises a reconditioning command. In at least one other embodiment, the discharge-needed state comprises a recalibration-needed state, and the battery-discharge command comprises a recalibration command. It is noted that reconditioning and recalibration are discussed below in connection with FIG. 7.

Figure 3:
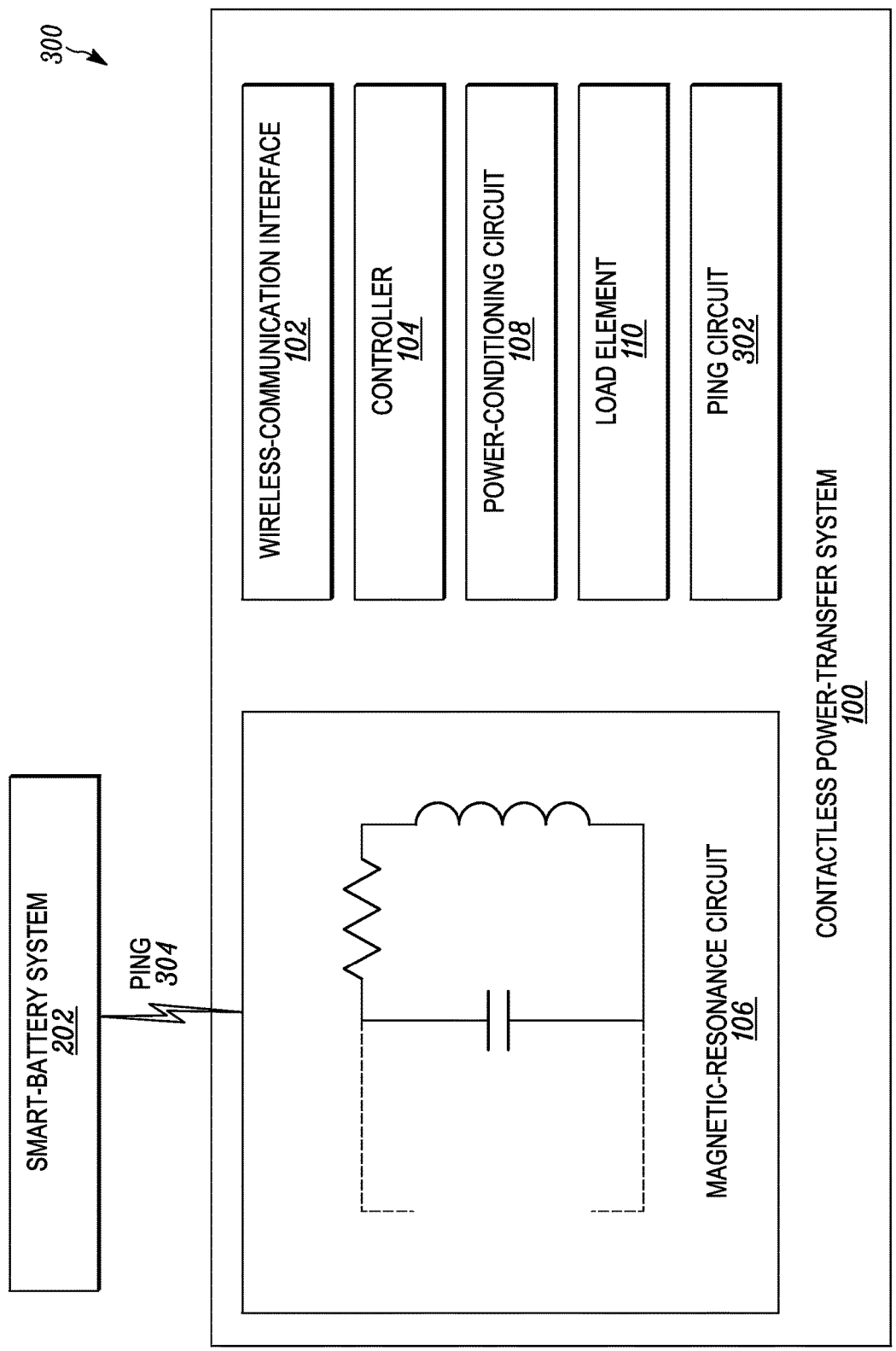
FIG. 3 depicts a second example scenario, in which the example contactless power-transfer system of FIG. 1 is engaged in wireless communication with the example smart-battery system of FIG. 2, in accordance with an embodiment.

FIG. 3 depicts a second example scenario, in which the example contactless power-transfer system of FIG. 1 is engaged in wireless communication with the example smart-battery system of FIG. 2, in accordance with an embodiment. In particular, FIG. 3 depicts a scenario 300, wherein the contactless power-transfer system 100 of FIG. 3 is shown wirelessly detecting the presence of the smart-battery system 202. In at least one embodiment, the contactless power-transfer system 100 further comprises a ping circuit 302 connected to the magnetic-resonance circuit 106 and to the controller 104. The ping circuit 302 is configured to (i) generate pings 304 and transmit the generated pings 304 via the magnetic-resonance circuit 106 and (ii) receive return pings 304 via the magnetic-resonance circuit 106 and output the received return pings 304 to the controller 104. In such an embodiment, the controller 104 determines that the smart-battery system 202 is in a discharge-needed state based at least in part on detecting the receipt of return pings 304 from the ping circuit 302. In order for such a system to perform as desired, the smart-battery system 202 should be outfitted with hardware and software for enabling the reflection of pings 304. In at least one embodiment, the smart-battery system 202 includes a tank circuit (i.e., a simple RLC circuit) for reflecting proximity pings 304. The smart-battery system 202 may detect the pings 304 and return the pings 304 to the contactless power-transfer system 100.

In FIG. 3, the ping 304 is embodied as an oscillating magnetic field. In at least one embodiment, a frequency of oscillation of the magnetic field that is used for the ping 304 is a different frequency than a frequency of oscillation of the magnetic fields that is used to transfer wireless power. In at least one embodiment, the frequency of oscillation of the magnetic field that is used for the ping 304 is greater than the frequency of oscillation of the magnetic field that is used to transfer wireless power.

Figure 4:
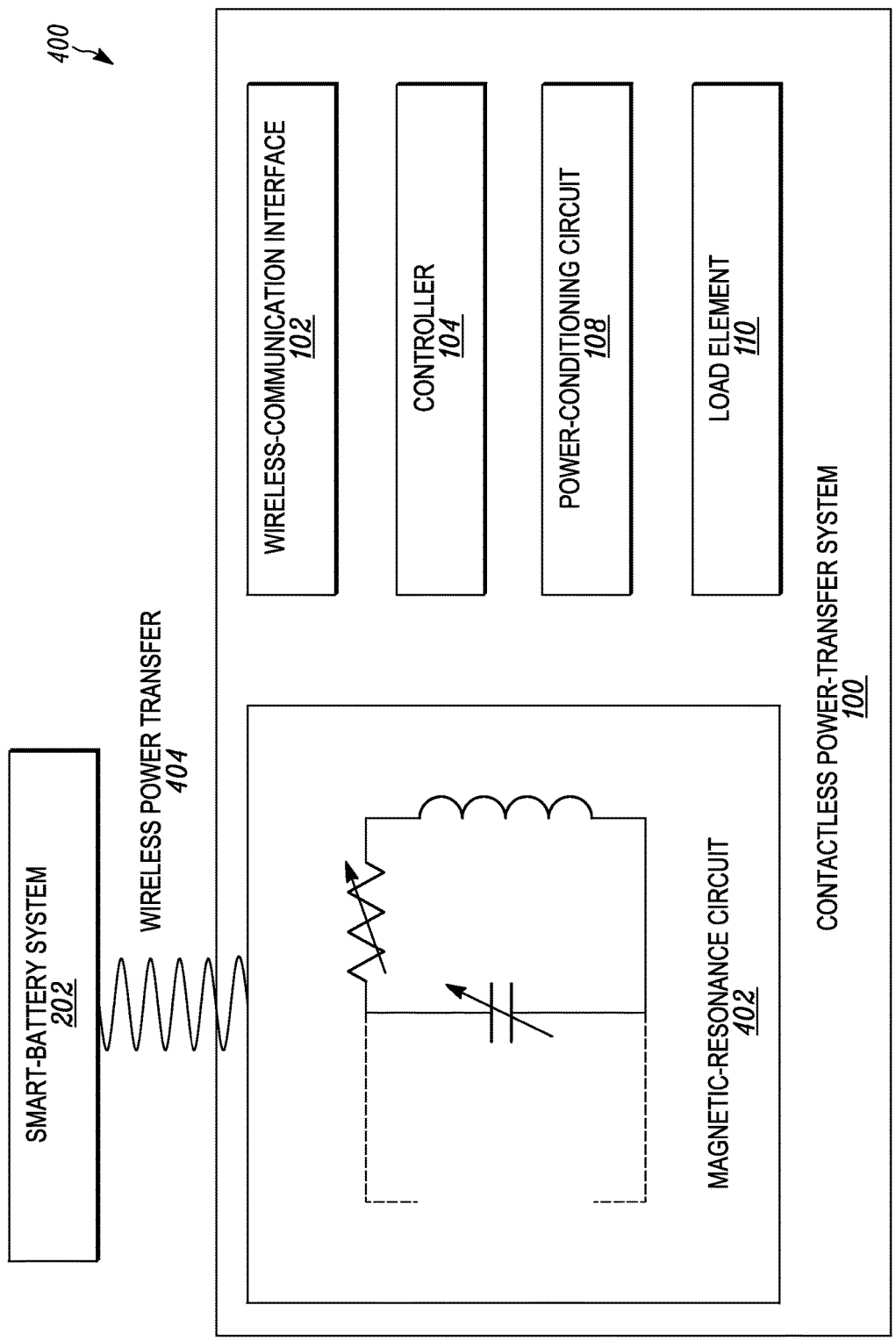
FIG. 4 depicts a third example scenario, in which the example contactless power-transfer system of FIG. 1 is receiving a wireless power transfer from the example smart-battery system of FIG. 2, in accordance with an embodiment.

FIG. 4 depicts a third example scenario, in which the example contactless power-transfer system of FIG. 1 is receiving a wireless power transfer from the example smart-battery system of FIG. 2, in accordance with an embodiment. In particular, FIG. 4 depicts a scenario 400 in which a magnetic-resonance circuit 402 that has a tunable resonant frequency couples with a smart-battery system 202 via a wireless power transfer 404. In at least one embodiment, the generated magnetic field (produced by the smart-battery system 202 and represented by the wireless power transfer 404) oscillates at a first frequency, and the magnetic-resonance circuit 402 is resonant at a second frequency that is substantially equal to the first frequency. In at least one embodiment, the controller 104 is further connected to the magnetic-resonance circuit 402 and further configured to tune the resonant frequency of the magnetic-resonance circuit 402. In at least one such embodiment, the controller 104 is configured to tune the resonant frequency of the magnetic-resonance circuit 402 based at least in part on at least one of a battery-reconditioning protocol and a battery-recalibration protocol. In at least one embodiment, the controller 104 is configured to tune the resonant frequency of the magnetic-resonance circuit 402 based at least in part on the first frequency. In at least one other embodiment, the controller 104 is configured to tune the resonant frequency of the magnetic-resonance circuit 402 based at least in part on received feedback data.

The generated magnetic field, represented by the wireless power transfer 404, oscillates at the first frequency. It is possible that other example smart-battery systems 202 generate magnetic fields that oscillate at different frequencies. Power transfer will only occur if the first frequency is substantially near the resonant frequency of the magnetic resonance circuit 402. For at least this reason, and possibly others, the contactless power-transfer system 100 is able—in at least some embodiments—to adjust the resonant frequency of the magnetic-resonance circuit 402 to be substantially near the first frequency.

In at least one embodiment, a power-transfer rate is a property of a smart-battery system 202 discharge process. The smart-battery system 202 discharge process may include a battery-reconditioning protocol and a battery-recalibration protocol. It is possible that different power-transfer rates are utilized during the smart-battery system 202 discharge process. One example technique that enables a configurable power transfer rate is adjusting the resonant frequency of the magnetic-resonance circuit 402. When the resonant frequency of the magnetic-resonance circuit 402 is made closer to the first frequency, magnetic coupling strength is increased and therefore, so too is the power-transfer rate. When the resonant frequency of the magnetic-resonance circuit 402 is made farther from the first frequency, magnetic coupling strength is decreased and therefore, so too is the power-transfer rate.

Adjusting an impedance of the magnetic-resonance circuit 402 alters the resonant frequency of the magnetic-resonance circuit 402, which in turn changes the coupling strength between the magnetic-resonance circuit 402 and the smart-battery system 202 via the wireless power transfer 404. Changing the coupling strength between the magnetic-resonance circuit 402 and the smart-battery system 202 alters the amount of power the magnetic-resonance circuit 402 absorbs from the smart-battery system 202. In at least one embodiment, adjusting the impedance includes adjusting one or both of a variable resistance and a variable capacitance of the magnetic-resonance circuit 402.

In at least one embodiment, the variable capacitance includes a capacitor bank, and adjusting the variable capacitance includes selecting a specific capacitor to be used from the capacitor bank. In at least one embodiment, the variable resistance includes a resistor bank, and adjusting the variable resistance includes selecting a specific resistor to be used from the resistor bank. In at least one embodiment, the variable resistance includes a variable resistor, and adjusting the variable resistance includes adjusting the variable resistor.

In at least one embodiment, the load 110 includes a rechargeable battery that has a charging profile, and adjusting the resonant frequency of the magnetic-resonance circuit 402 includes adjusting the charging profile of the rechargeable battery. In an embodiment, the charging profile, when adjusted, changes the impedance of the magnetic-resonance circuit 402. In this way, the resonant frequency of the magnetic-resonance circuit 402 can be controlled. By adjusting the resonant frequency of the magnetic-resonance circuit 402, the power received from the smart-battery system 202, via the wireless power transfer 404, can be controlled as well. The various parameters associated with a charging profile may include a charging rate, a number of cells to be charged, a charging threshold, and various other parameters can be used as well.

In at least one embodiment, the load 110 dissipates at least some of the received rectified power signal. In at least one embodiment, a heat sink helps dissipate heat generated by the load 110. In at least one embodiment, the load 110 stores at least some of the received rectified power signal. In at least one embodiment, the load 110 recycles at least some of the received rectified power signal. In at least one such embodiment, the at least some of the received rectified power signal is used by the contactless power-transfer system 100. In at least one other such embodiment, the at least some of the received rectified power signal is used by an external device.

Figure 5:
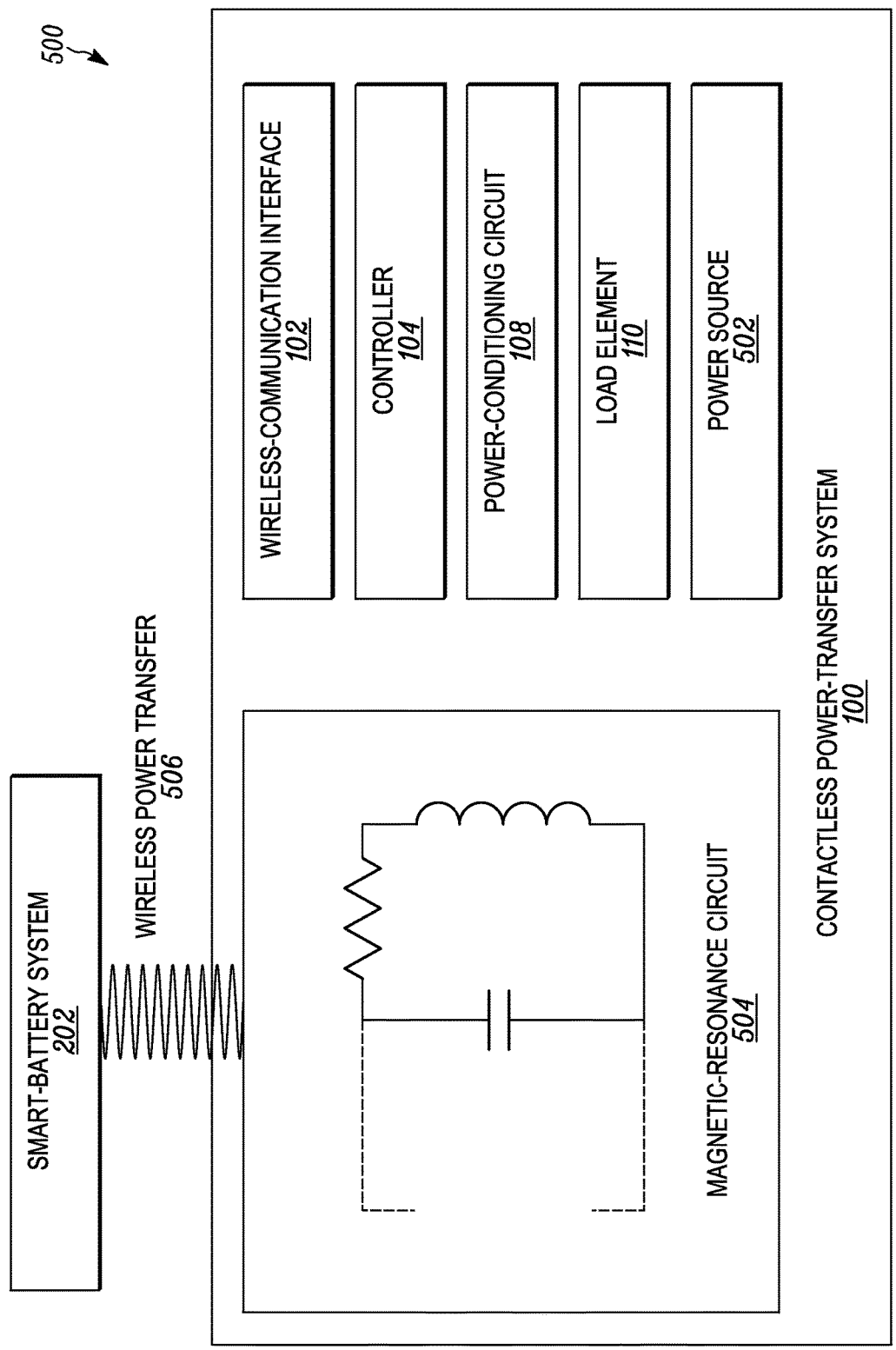
FIG. 5 depicts a fourth example scenario, in which the example contactless power-transfer system of FIG. 1 is making a wireless power transfer to the example smart-battery system of FIG. 2, in accordance with an embodiment.

FIG. 5 depicts a fourth example scenario, in which the example contactless power-transfer system of FIG. 1 is making a wireless power transfer to the example smart-battery system of FIG. 2, in accordance with an embodiment. In particular, FIG. 5 depicts a scenario 500 in which the contactless power-transfer system 100 sends power to a smart-battery system 202, via a wireless power transfer 506. In at least one embodiment, a magnetic-resonance circuit 504 is further connected to a power source 502 and is further configured to generate an oscillating magnetic field (wireless power transfer 506). The wireless power transfer 506 may be substantially similar to any of the wireless power transfer examples previously described herein such as the wireless power transfer 106 of FIG. 1 and the wireless power transfer 402 of FIG. 4. The associated frequency of the wireless power transfer 506 may be similar to or different from the associated frequency of, as examples, the wireless power transfer 106 and the wireless power transfer 402. In at least one embodiment, the controller 104 is further connected to the magnetic-resonance circuit 504 and further configured to determine that the smart-battery system 202 is in a chargeable state and responsively instruct the magnetic-resonance circuit 504 to generate an oscillating magnetic field depicted as the wireless power transfer 506. In at least one embodiment, charging or partially charging the smart-battery system 202 is a step of a smart-battery system 202 reconditioning or recalibration process. As noted above, reconditioning and recalibration are described below in connection with FIG. 7.

In embodiments wherein multiple smart-battery systems are using the same contactless power-transfer system 100, perhaps simultaneously, it is advantageous that a charging frequency be different from a discharging frequency. In at least one embodiment, each smart-battery system has unique charging and discharging frequencies, though certainly numerous other example implementations could be listed.

Figure 6:
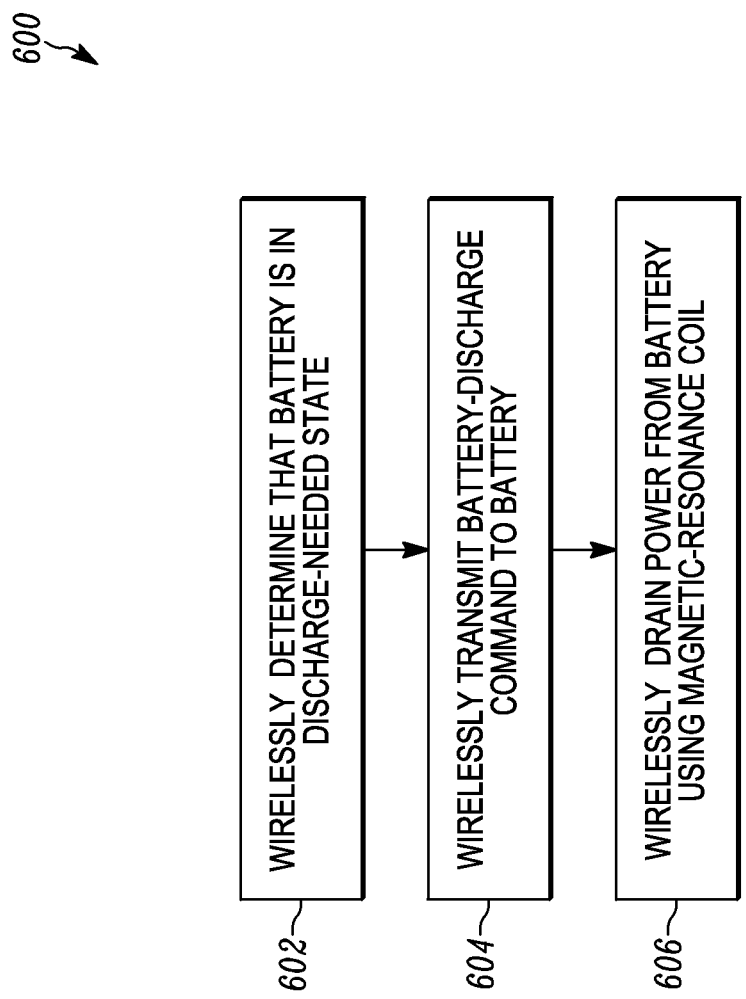
FIG. 6 depicts an example method, in accordance with an embodiment.

FIG. 6 depicts an example method, in accordance with an embodiment. In particular, FIG. 6 depicts an example process 600 that is described herein as being carried out by a contactless power-transfer system such as the contactless power-transfer system 100 of FIG. 1. This manner of description is by way of example and not limitation, as any suitably equipped, programmed, and configured system (i.e., device or combination of devices) could carry out the example process 600 that is described in connection with FIG. 6. Such a system may include a wireless-communication interface, a magnetic-resonance circuit, a power-conditioning circuit, a load element, and a controller programmed to carry out at least the described set of functions. At step 602, the contactless power-transfer system wirelessly determines that a smart-battery system (e.g., the smart-battery system 202) is in a discharge-needed state. At step 604, the contactless power-transfer system wirelessly transmits, via a wireless-communication interface, a battery-discharge command instructing the smart-battery system to generate an oscillating magnetic field. At step 604, the contactless power-transfer system wirelessly drains power from the smart-battery system; this may involve receiving a power signal into a power-conditioning circuit from a magnetic-resonance circuit that is configured to couple with the generated oscillating magnetic field. The power-conditioning circuit may be configured to rectify the power signal and output the rectified power signal to a load element, which assists in the draining of power from the smart-battery system.

Figure 7:
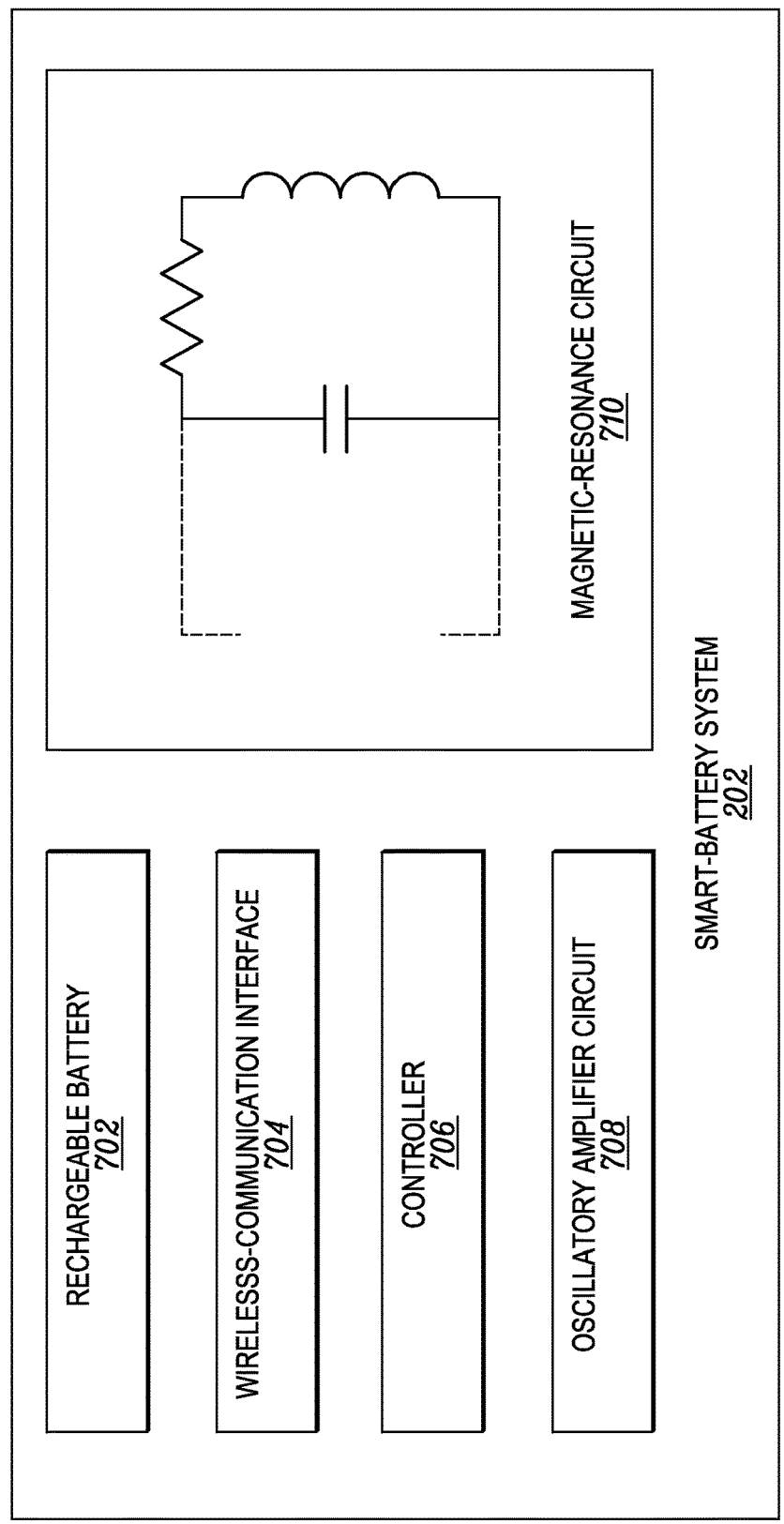
FIG. 7 depicts an example structure of the example smart-battery system of FIG. 2, in accordance with an embodiment.

FIG. 7 depicts an example structure of the example smart-battery system of FIG. 2, in accordance with an embodiment. In at least one embodiment, the smart-battery system 202 includes a rechargeable battery 702, a wireless-communication interface 704, a controller 706 connected to the wireless-communication interface 704, an oscillatory amplifier circuit 708 connected to the rechargeable battery 702, and a magnetic-resonance circuit 710 connected to the oscillatory amplifier circuit 708. The controller 706 is configured to receive, via the wireless-communication interface 704, a battery-discharge command instructing the rechargeable battery 702 to output a power signal. The oscillatory amplifier circuit 708 is configured to receive the power signal from the rechargeable battery 702, transform the received power signal into a corresponding oscillatory power signal, and output the oscillatory power signal. The magnetic-resonance circuit 710 is configured to (i) receive the oscillatory power signal from the oscillatory amplifier circuit 708 and (ii) generate an oscillating magnetic field at least in part by driving a coil with the received oscillatory power signal.

In at least one embodiment, the smart-battery system 202 is further configured to receive a battery-information request from a contactless power-transfer system. The smart-battery system is configured to responsively transmit a battery-information response to the contactless power-transfer system. Furthermore, a controller of the contactless power-transfer system may determine that the smart-battery system 202 is in a discharge-needed state based at least in part on the battery-information response. In at least one embodiment, the battery-information response includes one or more of a battery identifier, a charge level, a voltage level, a maintenance history, a condition status, and a calibration status. The contactless power-transfer system may then transmit a battery-discharge command.

As described, the smart-battery system 202 may receive from the contactless power-transfer system 100 a command that is referred to herein as a battery-discharge command. In some cases, the transmission of this battery-discharge command may occur after some initial wireless communication has taken place between the smart-battery system 202 and the contactless power-transfer system 100, perhaps at the initiation of the smart-battery system 202, perhaps at the initiation of the contactless power-transfer system 100. From such communications, or perhaps by another method such as the contactless power-transfer system 100 maintaining battery-maintenance records with respect to a number of smart-battery systems, including the example smart-battery system 202, the contactless power-transfer system 100 may make a determination to send a battery-discharge command to the smart-battery system 202, and may then in fact send that command.

The rechargeable battery 702 may include (or be included in) a battery pack having some number of cells. The battery pack may also include components such as but not limited to protection circuits, control circuits, and the like. Moreover, while the magnetic-resonance circuit 710 is depicted in FIG. 7 as being separate from the rechargeable battery 702, it may be the case in some instances that, in addition to one or more cells, a battery pack would include such a circuit having a resonating coil. And other configurations are possible as well.

Regardless of the manner in which the contactless power-transfer system 100 determines to send a battery-discharge command to the smart-battery system 202, that battery-discharge command may instruct the smart-battery system 202 to undergo one or more battery-maintenance procedures. Some examples of such procedures include reconditioning and recalibration, which are discussed in turn below.

In at least one embodiment, the battery-discharge command instructs the smart-battery system 202 to undergo a battery reconditioning process with respect to one, some, or all of its cells. For clarity of explanation and not by way of limitation, reconditioning is discussed at this point in the disclosure in connection with a single cell, though as stated it could be conducted with respect to more than one. When a cell is manufactured, it may undergo a conditioning process, during which it is cyclically charged and discharged in an effort to complete a process that is often referred to as formation of the cell. As known in the art, formation involves transformation of a cell's active material into a state in which that active material is useable for generating an electric current when reacting with another material. Reconditioning, then, is a process that might be undertaken after a given cell has been in use for some amount of time. The process of reconditioning often involves discharging a cell using a relatively small current, in order to essentially change the molecular structure of the cell in a way that rebuilds the cell to be close to (and perhaps equal or equivalent to) the cell's original chemical composition. Reconditioning typically has the effect of restoring much (and in some cases all) of a cell's initial capacity.

In at least one embodiment, the battery-discharge command instructs the smart battery system 202 to undergo a battery-recalibration process, which may also or instead be referred to as a calibration process. In some embodiments, the smart-battery system 202 includes an integrated circuit (IC) that is often referred to in the art as a fuel-gauge (or perhaps gas-gauge, or other similar name) IC for measuring and reporting the amount of charge remaining in a given cell or set of cells. Again for clarity and not by way of limitation, one cell is used for example explanation. It is not uncommon for a fuel-gauge IC to, from time to time, require recalibration, which is sometimes referred to as capacity retraining or capacity relearning. This recalibration is often needed due to partial charges and discharges of a cell that, over time, result in the digital readout of the cell's capacity not being an accurate reflection of the cell's actual capacity. Thus, a calibration or recalibration process might involve discharging a cell fully, configuring the fuel-gauge IC to consider that level empty, then fully charging a cell, and correspondingly then configuring the fuel-gauge IC to consider that level of charge as being full (i.e., 100%). In some instances, the just-described calibration procedure may be preceded by charging the battery fully. And certainly other example implementations could be listed as well.

FIG. 8 depicts the example smart-battery system of FIG. 2, incorporated into an example wireless-communication device, in accordance with an embodiment. In at least one embodiment, the smart-battery system 202 is configured to function as a power source for a wireless-communication device 800. The wireless-communication device 800 can be a mobile radio, a cell phone, a laptop, a tablet, a PDA, or any other wireless device that employs a rechargeable battery as a power source. The smart-battery system 202 can replace a standard rechargeable battery in a device. And certainly numerous other example implementations could be listed as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A contactless battery discharging system, comprising:
    a smart battery system, comprising:
        a rechargeable battery;
        a wireless communication interface;
        a controller connected to the wireless communication interface, the controller comprising a fuel gauge IC, the fuel-gauge IC detecting a need for reconditioning and discharging the rechargeable battery;
        a magnetic resonance circuit; and
        an oscillatory amplifier circuit connected to the rechargeable battery and the magnetic-resonance circuit;
        the controller sending a reconditioning request from the wireless communication interface upon the fuel gauge detecting the need for reconditioning and discharging the rechargeable battery;
    a contactless power-transfer system, comprising:
        a wireless communication interface;
        a controller connected to the wireless communication interface;
        a magnetic resonance circuit;
        a power conditioning circuit, the power-conditioning circuit connected to the magnetic-resonance circuit; and
        a load element coupled to the power-conditioning circuit;
    and wherein:
        the wireless communication interface of the contactless power-transfer system receiving the reconditioning request, and the contactless power-transfer system responsively transmitting a battery-discharge command instructing the smart-battery system to generate an oscillating magnetic field from the magnetic-resonance circuit of the smart battery system;
        the magnetic resonance circuit of the contactless power transfer system receiving the generated oscillating magnetic field and responsively outputting a corresponding power signal;
        the power-conditioning circuit of the contactless power-transfer system receiving the power signal, rectifying the received power signal, and outputting the rectified power signal; and
        the load element connected to the power-conditioning circuit receiving and dissipating the rectified power signal.

2. The contactless battery discharging system of claim 1, wherein the generated magnetic field oscillates at a first frequency, and the magnetic-resonance circuit is resonant at a second frequency that is substantially equal to the first frequency.

3. The contactless battery discharging system of claim 1, wherein the controller of the power transfer system is further connected to the magnetic-resonance circuit and further configured to tune a resonant frequency of the magnetic-resonance circuit.

4. The contactless battery discharging system of claim 3, wherein the controller of the power transfer system is configured to tune the resonant frequency of the magnetic-resonance circuit of the power transfer system based at least in part on at least one of a battery-reconditioning protocol and a battery-recalibration protocol.

5. The contactless battery discharging system of claim 3, wherein the controller of the power transfer system is configured to tune the resonant frequency of the magnetic-resonance circuit of the power transfer system based at least in part on received feedback data.

6. The contactless battery discharging system of claim 1, wherein the load element stores at least some of the received rectified power signal.

7. The contactless battery discharging system of claim 1, wherein the load element stores at least some of the received rectified power signal for use by an external device.

8. A contactless battery discharging system, comprising:
    a smart battery comprising a controller and fuel gauge for detecting a need for reconditioning and discharging of the smart battery and generating a reconditioning request, the smart battery further comprising an oscillatory amplifier circuit and a magnetic-resonance circuit;
    a power transfer system having a controller for receiving the reconditioning request and enabling a wireless transfer of power from the smart battery to the power transfer system by sending a battery-discharge command instructing the smart battery to generate a power signal via the oscillatory amplifier circuit, the smart battery wirelessly dissipating the power signal via the magnetic resonance circuit to a power conditioning circuit and load element of the power transfer system; and
    a wireless-communication interface for transferring the reconditioning request from the smart battery to the contactless battery discharging system and for sending the battery discharge command from the contactless battery discharging system to the smart battery.

9. The contactless battery discharging system of claim 8, wherein the wireless-communication interface is implemented using a BLUETOOTH protocol for detecting the smart battery as a pairing option.

10. The contactless battery discharging system of claim 8, wherein the wireless-communication interface is implemented as a RFID sensor, the RFID sensor sensing proximity of an RFID tag of the smart battery.

* * * * *